United States Patent
Harwood et al.

(10) Patent No.: US 7,050,834 B2
(45) Date of Patent: May 23, 2006

(54) VEHICULAR, HANDS-FREE TELEPHONE SYSTEM

(75) Inventors: Jody K. Harwood, Canton, MI (US); Jason G. Bauman, Huntington Woods, MI (US); Kenan Robert Rudnick, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 221 days.

(21) Appl. No.: 10/748,925

(22) Filed: Dec. 30, 2003

(65) Prior Publication Data

US 2005/0143134 A1 Jun. 30, 2005

(51) Int. Cl.
*H04B 1/38* (2006.01)

(52) U.S. Cl. .............. 455/563; 455/569.1; 455/569.2; 455/564; 455/550.1; 455/415; 455/567; 379/88.03; 379/420

(58) Field of Classification Search ............. 455/569.1, 455/596.2, 564, 550.1, 415, 563–567, 569.2; 379/88.03, 420
See application file for complete search history.

(56) References Cited

U.S. PATENT DOCUMENTS

| | | | |
|---|---|---|---|
| 4,961,212 A | 10/1990 | Marui et al. | |
| 5,353,376 A | 10/1994 | Oh et al. | |
| 5,864,603 A | 1/1999 | Haavisto et al. | |
| 6,041,300 A | 3/2000 | Ittycheriah et al. | |
| 6,052,603 A * | 4/2000 | Kinzalow et al. | 455/557 |
| 6,108,630 A * | 8/2000 | Kuechler et al. | 704/270 |
| 6,131,044 A | 10/2000 | Ryu | |
| 6,167,251 A | 12/2000 | Segal et al. | |
| 6,212,408 B1 | 4/2001 | Son et al. | |
| 6,226,497 B1 * | 5/2001 | Guntzer et al. | 455/66.1 |
| 6,240,303 B1 | 5/2001 | Katzur | |
| 6,263,216 B1 * | 7/2001 | Seydoux et al. | 455/564 |
| 6,366,649 B1 | 4/2002 | Chun et al. | |
| 6,449,496 B1 | 9/2002 | Beith et al. | |
| 6,505,159 B1 | 1/2003 | Theodore | |
| 6,636,741 B1 * | 10/2003 | Yoshioka et al. | 455/404.2 |
| 2001/0000505 A1 | 4/2001 | Segal et al. | |
| 2002/0086716 A1 * | 7/2002 | Pan | 455/569 |
| 2002/0142803 A1 * | 10/2002 | Yamamoto | 455/557 |
| 2002/0177472 A1 * | 11/2002 | Tomoda et al. | 455/569 |
| 2003/0032460 A1 | 2/2003 | Cannon et al. | |
| 2003/0040903 A1 | 2/2003 | Gerson | |
| 2003/0064755 A1 | 4/2003 | Piwowarski | |
| 2003/0083113 A1 | 5/2003 | Chua et al. | |
| 2003/0101052 A1 | 5/2003 | Chen et al. | |
| 2003/0114202 A1 * | 6/2003 | Suh et al. | 455/569 |

(Continued)

*Primary Examiner*—Lester G. Kincaid
*Assistant Examiner*—Khai Nguyen
(74) *Attorney, Agent, or Firm*—Brooks Kushman P.C.

(57) ABSTRACT

A hands-free, telephone system for a vehicle includes a vehicle appliance configured to read over vehicle speakers and display on a vehicle radio display a voice tag associated with a call incoming to a cell phone paired with the appliance for an operator to hear and view. The appliance uses text-to-speech (TTS) to transfer phonebook entries from the cell phone to memory of the appliance. The appliance uses TTS to read and display text messages incoming to the cell phone for the operator to hear and view. The appliance initiates connecting and disconnecting of the cell phone with the appliance in response to voice commands of the operator. The appliance wirelessly communicates vehicle diagnostic information to another device. The appliance controls vehicle functions in accordance with voice commands of the operator. The appliance receives music files from a device and plays the music files in accordance with operator voice commands.

11 Claims, 5 Drawing Sheets

U.S. PATENT DOCUMENTS

| | | |
|---|---|---|
| 2003/0135371 A1 | 7/2003 | Chang et al. |
| 2003/0191646 A1* | 10/2003 | D'Avelio et al. ............ 704/270 |
| 2004/0063471 A1* | 4/2004 | Kindo et al. ................ 455/566 |
| 2004/0219954 A1* | 11/2004 | Odinak .................... 455/569.1 |
| 2005/0064910 A1* | 3/2005 | Diedrich et al. ............. 455/563 |
| 2005/0075128 A1* | 4/2005 | Diedrich et al. ........... 455/552.1 |
| 2005/0096099 A1* | 5/2005 | Barclay et al. ........... 455/569.2 |
| 2005/0202853 A1* | 9/2005 | Schmitt et al. ........... 455/569.2 |

* cited by examiner

VEHICULAR, HANDS-FREE TELEPHONE SYSTEM

BACKGROUND OF THE INVENTION

1. Field of the Invention

The present invention relates generally to a vehicular, hands-free telephone system. More particularly, the present invention relates to methods of operating a hands-free, Bluetooth™ enabled telephone system for a vehicle.

2. Background Art

A conventional hands-free telephone system for a vehicle enables an operator of the vehicle such as the driver to talk on a cell phone while using both hands for driving the vehicle during a cell phone call. Typically, the driver manually uses keys on the cell phone to access functions, other than when answering a cell phone call, making a cell phone call, or re-dialing a recently dialed number. Conventional hands-free telephone systems employ a voice recognition module which enables the driver to answer and make cell phone calls and re-dial numbers using voice commands. As such, the advantages of conventional hands-free telephone systems for vehicles are added convenience and safety.

Certain vehicular, hands-free telephone systems employ Bluetooth™ communications technology. Such systems include a vehicle appliance which is typically configured as part of the operating panel of the vehicle. The vehicle appliance includes a Bluetooth™ communications module for wirelessly communicating with a Bluetooth™ enabled cell phone located somewhere in the vehicle. The vehicle appliance further includes a voice recognition module and other input interfaces such as keypads and buttons for receiving voice commands and other input commands from the driver regarding the use of the cell phone. The vehicle appliance is further connected to the vehicle electrical bus architecture in order to output voice and display information through the vehicle's radio speakers and radio display screen.

SUMMARY OF THE INVENTION

It is an object of the present invention to provide methods of operating a hands-free, Bluetooth™ enabled telephone system for a vehicle.

It is another object of the present invention to provide a method of operating a hands-free, Bluetooth™ enabled telephone system for a vehicle in which the method includes reading over the vehicle speakers and/or displaying on the vehicle radio display a voice tag associated with a call incoming to a Bluetooth™ enabled cell phone paired with the telephone system for an operator of the vehicle to hear and/or view.

It is a further object of the present invention to provide a method of operating a hands-free, Bluetooth™ enabled telephone system for a vehicle in which the method includes using text-to-speech (TTS) to transfer phonebook entries between a Bluetooth™ enabled cell phone and the telephone system in order to synchronize the phonebooks.

It is also an object of the present invention to provide a method of operating a hands-free, Bluetooth™ enabled telephone system for use in a vehicle in which the method includes using TTS to read over the vehicle speakers and/or display on the vehicle radio display text messages incoming to a Bluetooth™ enabled cell phone paired with the telephone system for an operator of the vehicle to hear and/or view.

It is also another object of the present invention to provide a method of operating a hands-free, Bluetooth™ enabled telephone system for use in a vehicle in which the method includes controlling vehicle functions via the telephone system in accordance with voice commands of an operator of the vehicle.

It is still a further object of the present invention to provide a method of operating a hands-free, Bluetooth™ enabled telephone system for use in a vehicle in which the method includes using voice commands of an operator of the vehicle in order to manually connect and disconnect, from the telephone system, a Bluetooth™ enabled device such as a cell phone with the telephone system.

It is still another object of the present invention to provide a method of operating a hands-free, Bluetooth™ enabled telephone system for use in a vehicle in which the method includes transmitting vehicle diagnostics from the telephone system to a Bluetooth™ enabled device.

It is still yet a further object of the present invention to provide a method of operating a hands-free, Bluetooth™ enabled telephone system for use in a vehicle in which the method includes storing two phonebooks in the memory of the telephone system for an operator of the vehicle to access.

It is still yet another object of the present invention to provide a method of operating a hands-free, Bluetooth™ enabled telephone system for use in a vehicle in which the method includes wirelessly transmitting MP3 files from a Bluetooth™ enabled device to the telephone system for play on the vehicle radio in accordance with voice commands of an operator of the vehicle.

In carrying out the above objects and other objects, the present invention provides a hands-free telephone system for a vehicle. The system includes a cell phone located in the vehicle. The cell phone is operable for enabling an operator to make a cell phone call with a phone external to the vehicle. The system further includes a vehicle appliance integrated into the vehicle. The vehicle appliance has a controller, a communications module, memory, a display module, and a voice synthesizer. The communications module wirelessly communicates with the cell phone to detect when the cell phone receives an incoming call from an external phone having a telephone number and to receive the telephone number of the external phone from the cell phone. The memory stores a list of names and associated telephone numbers. The controller accesses the memory to locate a name stored in the memory corresponding to the telephone number of the external phone. The voice synthesizer outputs the name corresponding to the telephone number of the external phone over a vehicle speaker for the operator to hear.

The vehicle appliance may further include a display module which is operable with the controller for generating a textual display of the name corresponding to the telephone number of the external phone for output by a vehicle radio display for the operator to view.

The vehicle appliance may further include a text-to-speech (TTS) module. In the case of the incoming call being a text message, the communications module wirelessly communicates with the cell phone to receive the text message from the cell phone. In this case, the TTS module is operable with the communications module for converting the text message into speech and the voice synthesizer outputs the speech over the vehicle speaker for the operator to hear. In this case, the vehicle appliance may further include a display module operable with the communications module for displaying the text message on the vehicle radio display for the operator to view.

The vehicle appliance may further include a voice recognition module for recognizing voice commands stated by the operator. In this case, the controller generates a control signal to control operation of a vehicle component in response to a vehicle component voice command received by the voice recognition module from the operator.

Further, in carrying out the above objects and other objects, the present invention provides another hands-free telephone system for a vehicle. This system includes a Bluetooth™ enabled cell phone located in the vehicle. The cell phone stores a phonebook having entries with each entry including a name text and an associated telephone number. The system further includes a vehicle appliance integrated into the vehicle. The vehicle appliance has a Bluetooth™ enabled communications module, memory, a text-to-speech (TTS) module, and a voice synthesizer. The communications module wirelessly communicates with the cell phone to receive a selected phonebook entry from the cell phone. The TTS module converts the name text of the selected phonebook entry into a voice tag for play by the voice synthesizer over a vehicle speaker for the operator to hear. The memory stores the converted voice tag and the associated telephone number of the selected phonebook in a phonebook for access by the voice synthesizer. The communications module preferably wirelessly communicates with the cell phone to receive the selected phonebook entry using the OBEX file transfer protocol.

The vehicle appliance may further include a controller operable for accessing the memory to determine if the converted voice tag of the name text of the selected phonebook entry corresponds to a voice tag of a name text already stored in the memory. If the converted voice tag of the name text of the selected phonebook entry corresponds to a voice tag of a name text already stored in the memory, the voice synthesizer outputs an indication over the vehicle speaker for the driver to hear indicating that the converted voice tag of the name text of the selected phonebook entry corresponds to a voice tag of a name text already stored in the memory.

In this case, the vehicle appliance may further include a voice recognition module operable for receiving a verbal pronunciation of the converted voice tag of the selected phonebook entry by the operator. The voice recognition module converts the verbal pronunciation into a voice tag for play by the voice synthesizer over the vehicle speaker for the operator to hear. The memory stores the voice tag converted by the voice recognition module in place of the converted voice tag generated by the TTS module for access by the voice synthesizer.

The memory may have at least first and second phonebooks for storing entries. Each phonebook of the memory stores a list of entries with each entry including a voice tag and an associated telephone number. One of the phonebooks is operable at a time. In this case, the voice recognition module is operable for receiving a voice command indicative of a selected memory phonebook from the operator. The controller then enables the selected memory phonebook for use by the operator.

The voice recognition module is further operable for receiving a voice command indicative of disconnecting the cell phone from the communications module. In this case, the controller disconnects the communications module from the cell phone in response to the voice command. The voice recognition module is also operable for receiving a second voice command indicative of connecting the disconnected cell phone with the communications module. In this case, the controller reconnects the cell phone with the communications module in response to the second voice command.

Also, in carrying out the above objects and other objects, the present invention provides another hands-free telephone system for a vehicle. This system includes a Bluetooth™ enabled device and a vehicle appliance integrated into the vehicle. The vehicle appliance has a controller, a Bluetooth™ enabled communications module, and memory. The controller is operable with vehicle components for generating vehicle diagnostic information. The memory stores the vehicle diagnostic information. The communications module wirelessly communicates the vehicle diagnostic information to the device. Preferably, the communications module wirelessly communicates with the device to receive the diagnostic information using the OBEX file transfer protocol.

This system may further include a second Bluetooth™ enabled device operable for storing MP3 music files. In this case, the communications module wirelessly communicates with the second device to receive the MP3 music files and the memory stores the received MP3 music files. In this case, the vehicle appliance may further include a voice recognition module for receiving voice commands of the operator. The controller iss operable with a vehicle radio system to play the MP3 music files over a vehicle speaker for the operator to hear in accordance with the voice commands of the operator.

DETAILED DESCRIPTION OF THE PREFERRED EMBODIMENT(S)

Figure 1:
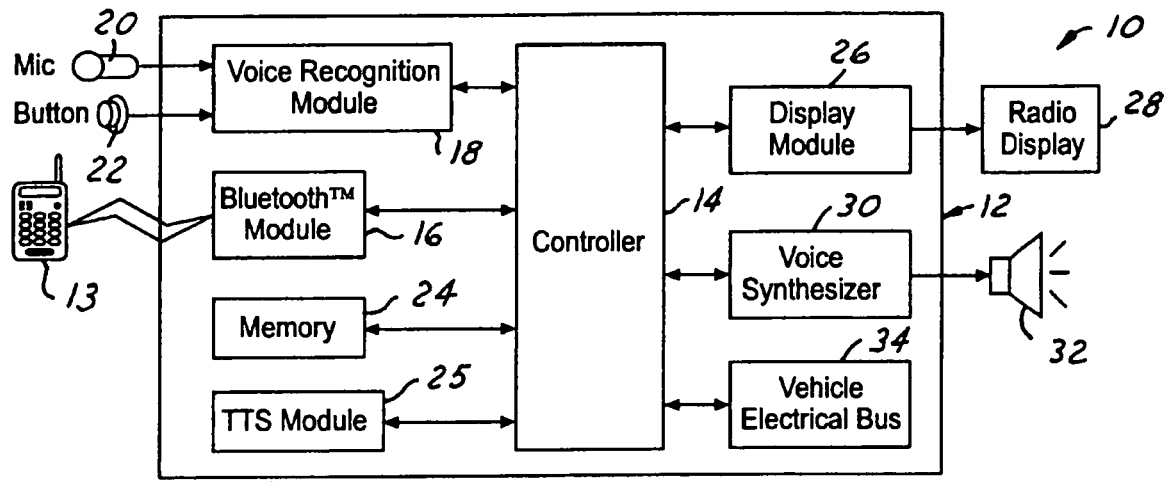
FIG. 1 illustrates a block diagram of a hands-free, Bluetooth™ enabled telephone system for a vehicle in accordance with the present invention.

Referring now to FIG. 1, a block diagram of a hands-free, Bluetooth™ enabled telephone system 10 for a vehicle in accordance with the present invention is shown. Telephone system 10 includes a vehicle appliance 12 which is integrated as part of the vehicle. Vehicle appliance 12 enables an operator of the vehicle such as a driver to use a Bluetooth™ enabled device such as a cell phone 13 located somewhere in or near the vicinity of the vehicle in a hands-free manner. Vehicle appliance 12 enables the driver to control the operation of cell phone 13 using voice commands. Through the use of Bluetooth™ communications technology, vehicle appliance 12 and cell phone 13 wirelessly transmit signals between themselves to communicate with one another.

Vehicle appliance 12 includes a controller 14 which controls the overall operation of the vehicle appliance. Vehicle appliance 12 further includes a Bluetooth™ communications module 16 which wirelessly communicates with Bluetooth™ enabled devices such as cell phone 13.

Vehicle appliance 12 also includes a voice recognition module 18. Voice recognition module 18 is connected to a microphone 20 for receiving voice communications including voice commands from the driver. Voice recognition module 18 transfers voice communications from the driver via a microphone 20 to controller 14. Voice recognition module 18 translates voice commands from the driver into corresponding electrical signals for use by controller 14. For example, voice recognition module 18 translates the voice command "dial" into a corresponding electrical command signal for use by controller 14. Similarly, voice recognition module 18 translates numeric characters spoken by the driver into corresponding electrical information signals for use by controller 14. Voice recognition module 18 is connected to an input button 22 for receiving manual commands from the driver. For example, the driver presses input button 22 when the driver desires to have vehicle appliance 12 go into certain modes such as the mode for making a cell phone call to an external phone using cell phone 13.

Vehicle appliance 12 further includes memory 24. Memory 24 stores information in a phonebook(s) which may also be stored in a phonebook of cell phone 13. Such information includes a listing of names and associated telephone numbers. Vehicle appliance 12 also includes a display module 26 which is connected to a display of the vehicle such as an LCD display 28 of the vehicle's radio via the vehicle electrical bus architecture for displaying information to the driver.

Vehicle appliance 12 also includes a voice synthesizer 30 which generates electronic voice signals in response to corresponding electrical signals generated by controller 14 during operation of telephone system 10. Voice synthesizer 30 is connected to a speaker 32 mounted in the vehicle such as the vehicle's radio speakers via the electrical bus architecture. Voice synthesizer 30 outputs the electronic voice signals to radio speaker 32 for the driver to hear. For example, such outputted electronic voice signals may be "Dialing John" when cell phone 13 is dialing John's telephone number. Vehicle appliance 12 further includes a text-to-speech (TTS) module 25 for converting text messages into speech for output by voice synthesizer 30 and for storage in memory 24.

An example of the general process employed by telephone system 10 when the driver wants to make a cell phone call will now be described in order to provide a general description of the operation of the telephone system. In order to initiate a cell phone call, the driver presses input button 22 to advise telephone system 10 that the driver wants to make a cell phone call. In response, telephone system 10 mutes the radio to free the radio speaker 32 for use by the telephone system. The driver then says multiple voice commands such as "Dial John" into microphone 20.

Voice recognition module 18 processes these voice commands to determine that the driver wants to make a call to John and provides this information to controller 14. Controller 14 accesses a phonebook of memory 24 to find a stored telephone number for "John." (Controller 14 may also access cell phone 13 to find a stored telephone number for "John" using communications module 16.) Upon locating the telephone number for John, controller 14 instructs communications module 16 to wirelessly transmit the digits of John's telephone number to cell phone 13 for the cell phone to dial. Cell phone 13 then dials John's telephone number to make the cell phone call to John.

A cell phone call is connected between cell phone 13 and John's phone using typical cell phone communications. John then says "Hello" into his phone which is received by cell phone 13. Cell phone 13 wirelessly transfers John's "hello" to communications module 16. Controller 14 then outputs John voice with the word "hello" to speaker 32 for the driver to hear. The driver then says "hello John" into microphone 20. Communications module 16 wirelessly transmits the driver's "hello John" to cell phone 13 for transmission from the cell phone to John's phone using typical cell phone communications.

This process is repeated to enable the conversation between the driver and John. In this way, the driver is able to communicate with John in a hands-free manner through the use of cell phone 13. As the speaker and microphone of cell phone 13 are not required to make a call when using telephone system 10, the cell phone may be in a briefcase, vehicle trunk, etc.

Figure 2:
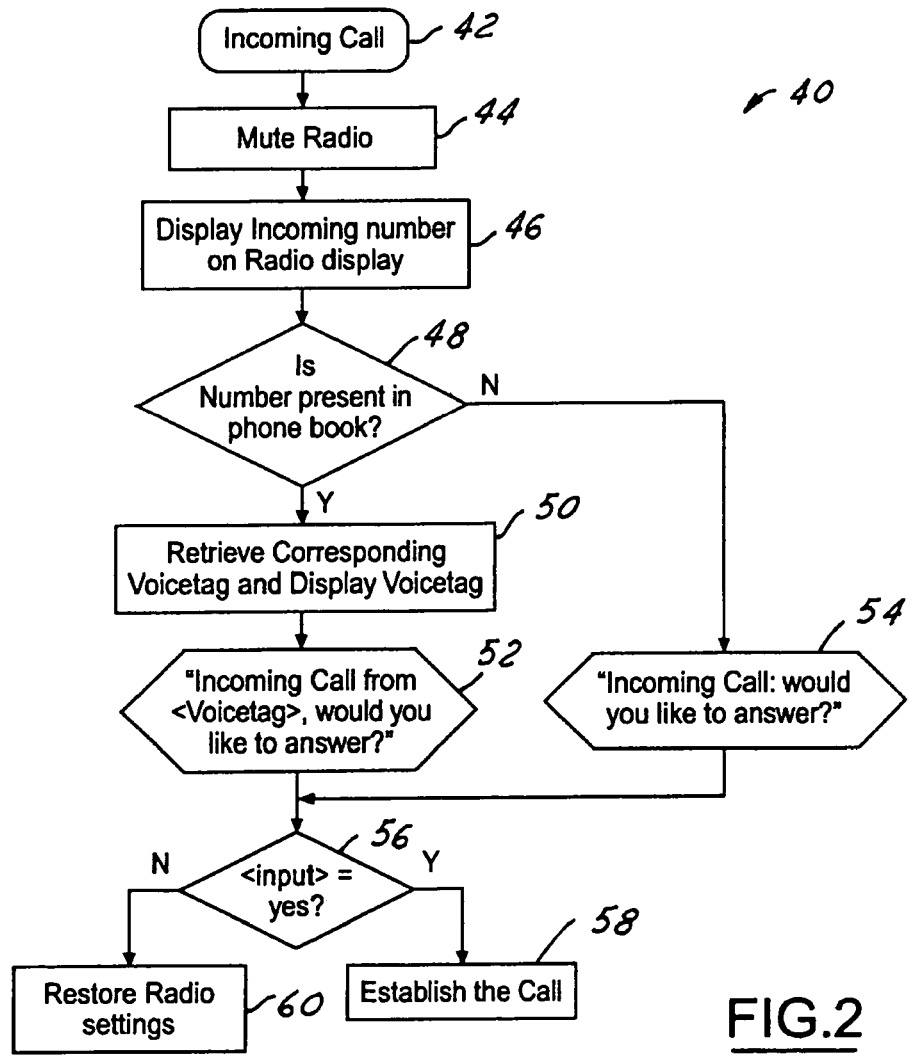
FIG. 2 illustrates a flowchart illustrating the operation in accordance with the present invention of reading over the vehicle speakers and/or displaying on the vehicle radio a voice tag associated with a call incoming to a Bluetooth™ enabled cell phone paired with the telephone system for an operator of the vehicle to hear and/or view.

Referring now to FIG. 2, with continual reference to FIG. 1, a flowchart 40 illustrating the operation in accordance with the present invention of reading over radio speaker 32 and/or displaying on radio display 28 a voice tag associated with an incoming call 42 to cell phone 13 for the driver to hear and/or view is shown. In response to incoming call 42, controller 14 mutes radio speaker 32 as shown in block 44. Radio display 28 then displays the number of incoming call 42 for the driver to view as shown in block 46. Controller 14 determines if the number of incoming call is stored in the phonebook of memory 24 (and/or in the phonebook of cell phone 13) as shown in diamond 48. If the number is stored, then controller 14 retrieves the corresponding voice tag from memory 24 (and/or cell phone 13) as shown in block 50. Controller 14 then displays the voice tag on radio display 28 for the driver to view. Voice synthesizer 30 then outputs an inquiry such as "incoming call from <voice tag>, would you like to answer?" for the driver to hear on speaker 32 as shown in tetrahedron 52. If the number is not stored, then voice synthesizer 30 outputs an indication such as "incoming call, would you like to answer" for the driver to hear as shown in tetrahedron 54. In either case, if voice recognition module 18 hears the driver says "yes" at diamond 56, then controller 14 establishes the call as shown in block 58. If voice recognition module hears the driver say "no" at diamond 56, then controller 14 restores the radio as shown in block 60.

Referring back to FIG. 1, the operation in accordance with the present invention of controlling vehicle functions via telephone system 10 in accordance with voice commands the driver will now be described. As shown in FIG. 1, controller 14 is connected to the vehicle electrical bus 34 in order to communicate with vehicle components such as the vehicle radio, the vehicle climate control, and the vehicle doors which are also connected to the vehicle electrical bus. Controller 14 controls such vehicle components via vehicle electrical bus 34 in accordance with voice commands of the driver. For example, the driver may say the voice command "CD" into microphone 20 for receipt by voice recognition module 18. Voice recognition module 18 generates a corresponding electrical control signal for controller 14. In accordance with the control signal, controller 14 controls the vehicle radio to function in the CD mode. Likewise, the voice command may be "heat" and, in response, controller 14 controls the vehicle climate control to turn on the interior heater functions. Further, the driver may say "lower window" and, in response, controller 14 controls the vehicle door to lower the corresponding window. The envisioned examples are endless and each example shares the feature of controller 14 controlling a vehicle component in response to the driver's voice commands received by voice recognition module 18.

Figure 3A:
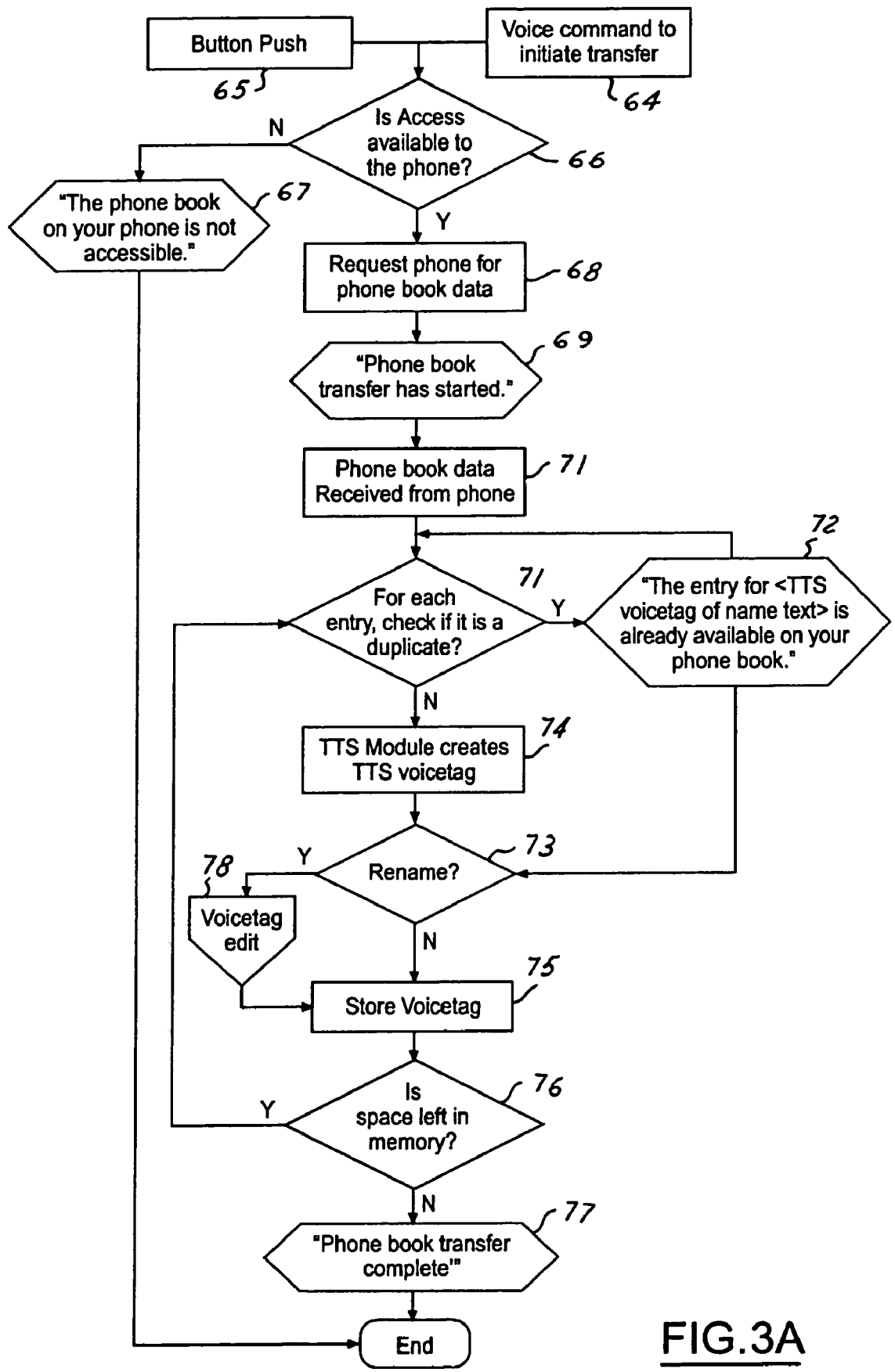
FIGS. 3A and 3B illustrate flowcharts illustrating the operation in accordance with the present invention of using text-to-speech (TTS) to transfer phonebook entries between a Bluetooth™ enabled cell phone and the telephone system in order to synchronize the phonebooks.
Figure 3B:
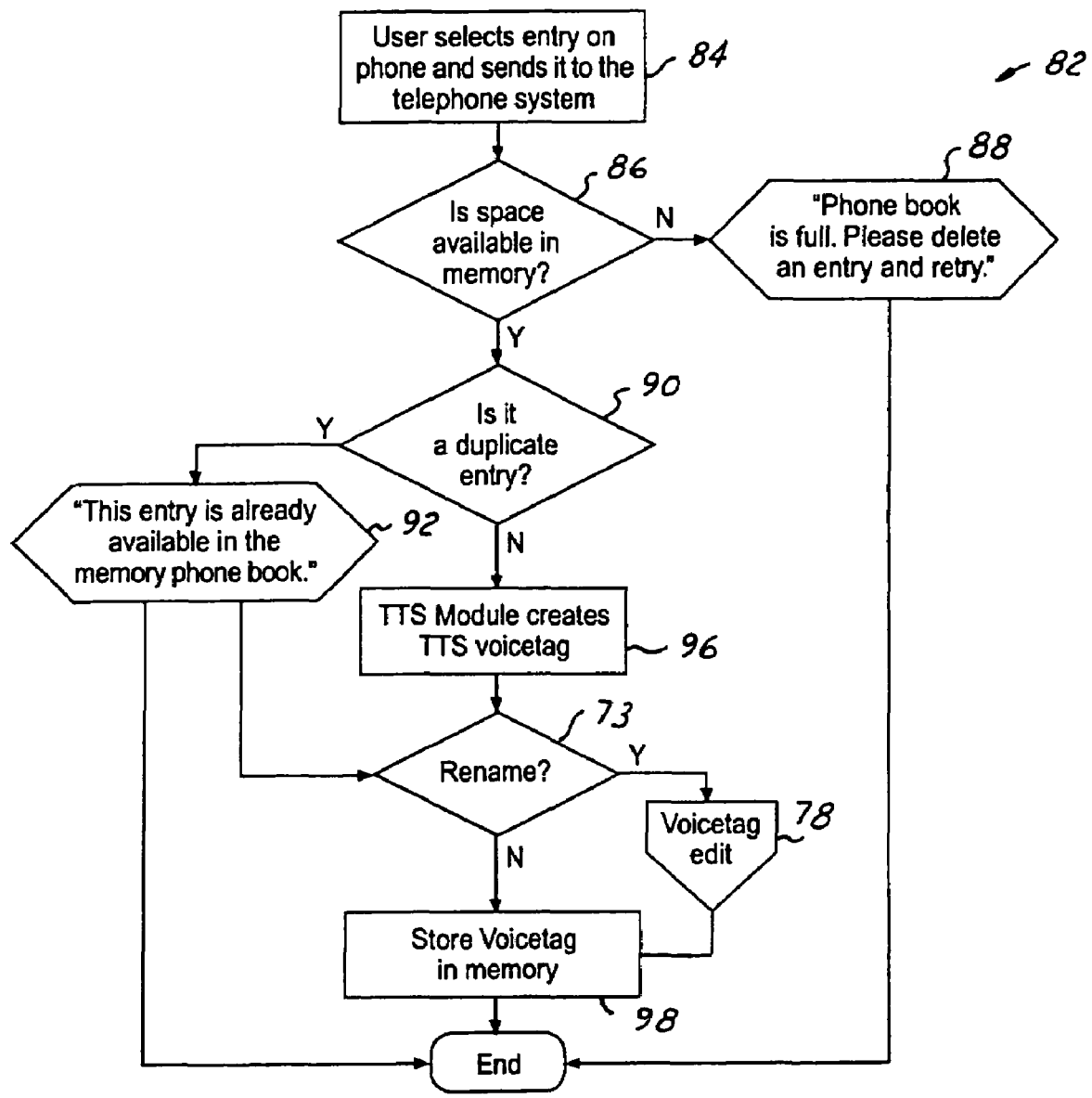

Referring now to FIGS. 3A and 3B, with continual reference to FIG. 1, flowcharts 62 and 82 illustrating the operation in accordance with the present invention of using text-to-speech (TTS) to transfer phonebook entries between cell phone 13 and telephone system 10 in order to synchronize the phonebooks are shown. In general, memory 24 of vehicle appliance 12 stores a phonebook having a list of entries. An entry includes a voice tag of a name text with a list of associated telephone numbers such as mobile, home, work, and pager numbers. Cell phone 13 stores a phonebook having entries which each include a name text and a list of associated telephone numbers. The operation of telephone system 10 in accordance with the present invention enables the driver to transfer the entries of the phonebook of cell phone 13 to memory 24 of vehicle appliance 12 and create voice tags for each of the name texts of the transferred entries using TTS module 25.

Flowchart 62 in FIG. 3A illustrates the operation of pulling all entries of the phonebook of cell phone 13 to the phonebook of memory 24 of vehicle appliance 12. To initiate transfer of all phonebook entries from cell phone 13, the driver speaks the appropriate voice command as shown in block 64 and/or presses input button 22 as shown in block 65. In response, controller 14 queries cell phone 13 via communications module 16 to see if access is available to the phonebook of cell phone 13 as shown in diamond 66. Access is available if cell phone 13 is operable to transfer the phonebook entries using the OBEX protocol for Bluetooth™ communications. If access is not available, then voice synthesizer 30 provides such indication by outputting "the phonebook on your cell phone is not accessible" over speaker 32 for the driver to hear as shown in tetrahedron 67.

If access is available, then controller 14 requests cell phone 13 to transmit to communications module 16 all of the phonebook entries stored in the cell phone as shown by block 68. Voice synthesizer 30 provides notification such as "phonebook transfer has started" over speaker 32 for the driver to hear as shown by tetrahedron 69. In turn, controller 14 receives the phonebook entries stored in cell phone 13 as the cell phone transmits the entries to communications module 16 using the OBEX FTP as shown in block 70.

As each entry arrives from cell phone 13, controller 14 checks memory 24 to see if the name text of a transferred entry is already stored in memory 24 at diamond 71. That is, controller 14 checks the name text of the transferred entry with the voice tags of the name texts stored in memory 24 to determine if the name text of the transferred entry is a duplicate. If the name text of the transferred entry corresponds to a voice tag of a name text stored in memory 24 at diamond 71, then voice synthesizer 30 outputs an alert such as "the entry for <voice tag of name text> is already available on your telephone system phone book" over speaker 32 for the driver to hear as shown in tetrahedron 72. The driver then has the opportunity to ignore the alert and overwrite the entry for the voice tag of the name text stored in memory 24 or heed the alert and not overwrite the entry.

At diamond 73, the driver also has the option of renaming the name text for the transferred entry by speaking the name text into microphone 20 such that the spoken name text differs from the <voice tag of the name text> stored in memory 24 as shown in pentagon 78. Voice recognition module 18 then converts the spoken name text into a pronunciation. Memory 24 then stores the pronunciation of the spoken name text as the voice tag of the name text of the transferred entry as shown in block 75. TTS module 25 may then read this stored voice tag for voice synthesizer 30 to output for the driver to hear during operation of telephone system 10.

If the name text of the transferred entry does not correspond to a stored voice tag of a name text at diamond 71, then TTS module 25 creates a voice tag for the name text of the transferred entry as shown in block 74. The driver then has the opportunity to rename the voice tag for the name text of the transferred entry at diamond 73. For example, TTS module creates the voice tag <gra-ti-ot> for the name text "gratiot" although the correct pronunciation for the name text "gratiot" is <gra-chet>. In this case, voice synthesizer 30 pronounces the incorrect voice tag <gra-ti-ot> on speaker 32 for the driver to hear. The driver may then edit the voice tag by stating the proper pronunciation <gra-chet> into microphone 20 at pentagon 78. Memory 24 then stores the proper pronunciation of the spoken name text as the voice tag of the name text of the transferred entry as shown in block 75. TTS module 25 may then read the stored voice tag <gra-chet> for voice synthesizer 30 to output on speaker 32 for the driver to hear during operation of telephone system 10.

If the voice tag created by TTS module 25 is not renamed at diamond 73, then memory 24 stores the voice tag at block 75. TTS module 25 may then read this stored voice tag for voice synthesizer 30 to output on speaker 32 for the driver to hear during operation of telephone system 10.

This process continues until all of the phonebook entries of cell phone 13 have been transferred to memory 24 or until memory 24 runs out of storage space as shown by diamond 76. Upon the process terminating, voice synthesizer 30 outputs a confirmation to the effect of "phonebook transfer is complete" over speaker 32 for the driver to hear as shown by tetrahedron 77.

As indicated above, voice synthesizer 30 pronounces back to the driver the voice tags stored in memory 24 during operation of telephone system 10. As such, when voice tags are played back to the driver over speaker 32 during the operation of telephone system 10 each voice tag will be played back using the same computerized voice. As such, the voice tags are speaker independent so that anyone can use the voice tags.

Flowchart 82 in FIG. 3B illustrates the operation of pushing a single entry of the phonebook of cell phone 13 to the phonebook of memory 24 of vehicle appliance 12. To initiate transfer of single entry from cell phone 13, the driver selects an entry on cell phone 13 and the cell phone communicates the selected entry to communications module 16 as shown in block 84. In response, controller 14 determines if memory 24 has enough storage space for storing the selected entry of cell phone 13 as shown by diamond 86. If storage space in memory 24 is not available, then voice synthesizer 30 provides such indication by outputting "the phonebook is full, please delete an entry and retry" over speaker 32 for the driver to hear as shown in tetrahedron 88.

If storage space in memory 24 is available, then controller 14 checks memory 24 to see if the name text of the selected entry is already stored in memory 24 at diamond 90. If the name text of the selected entry corresponds to a voice tag of a name text stored in memory 24 at diamond 71, then voice synthesizer 30 outputs an alert such as "this entry is already available in the memory of your phone book" over speaker 32 for the driver to hear as shown by tetrahedron 92. As before, the driver then has the opportunity to ignore the alert and overwrite the entry for the voice tag of the name text stored in memory 24 or heed the alert and not overwrite the entry.

At diamond 73, the driver also has the option of renaming the name text for the selected entry by speaking the name text into microphone 20 such that the spoken name text differs from the voice tag of the corresponding entry already stored in memory 24 as shown in pentagon 78. Voice recognition module 18 then converts the spoken name text into a pronunciation. Memory 24 then stores the pronunciation of the spoken name text as the voice tag of the name text of the transferred entry as shown in block 96. TTS module 25 may then read this stored voice tag for voice synthesizer 30 to output for the driver to hear during operation of telephone system 10.

If the name text of the selected entry does not correspond to a stored voice tag of a name text at diamond 90, then TTS module 25 creates a voice tag for the name text of the selected entry as shown in block 96. The driver then has the opportunity to rename the voice tag for the name text of the transferred entry at diamond 73. If renamed by the driver, memory 24 then stores the proper pronunciation of the spoken renamed name text as the voice tag for the name text of the selected entry as shown in block 98. TTS module 25 may then read this stored renamed voice tag for voice synthesizer 30 to output on speaker 32 for the driver to hear during operation of telephone system 10.

If the voice tag created by TTS module 25 is not renamed at diamond 73, then memory 24 stores the voice tag at block 75. TTS module 25 may then read this stored voice tag for voice synthesizer 30 to output on speaker 32 for the driver to hear during operation of telephone system 10.

Figure 4:
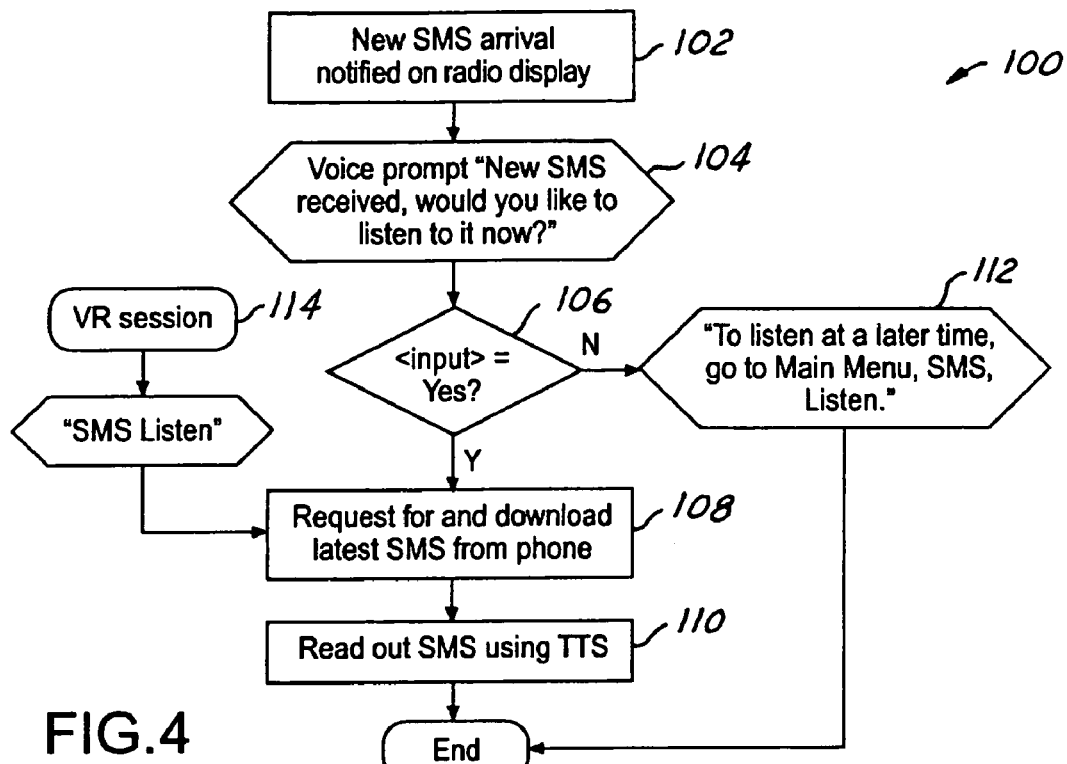
FIG. 4 illustrates a flowchart illustrating the operation in accordance with the present invention of using TTS to read and display text messages incoming to a Bluetooth™ enabled cell phone paired with the telephone system for an operator of the vehicle to hear and view.

Referring now to FIG. 4, with continual reference to FIG. 1, a flowchart 100 illustrating the operation in accordance with the present invention of using TTS to read and display text messages such as SMS messages incoming to a cell phone 13 for the driver to hear and view is shown. Upon cell phone 13 receiving an incoming text message, the cell phone communicates with communications module 16 to advise that the incoming text message has been received. Radio display 28 then displays a notification of the text message for the driver to view as shown in block 102. Voice synthesizer 30 then outputs an indication such as "new text message received, do you want to listen to it" for the driver to hear on speaker 32 as shown in tetrahedron 104. If the driver says "yes" into voice recognition module 18 at diamond 106, then controller 14 obtains the text message from cell phone 13 as shown in block 108. Controller 14 may obtain the text message from cell phone 13 via communications module 16 using the OBEX profile. TTS module 25 then converts the text message into speech and voice synthesizer 30 outputs the converted speech to speaker 32 for the driver to hear as shown in block 110. Radio display 28 may display the text message for the driver to view as well.

If the driver says "no" into voice recognition module 18 at diamond 106, then voice synthesizer 30 outputs a message for the driver to hear regarding later retrieval of the text message as shown in tetrahedron 112. The driver may retrieve the text message later by using a voice command to initiate a text messaging session as shown in oval 114. In response, voice synthesizer 30 outputs a confirmation prompt on speaker 32 for the driver to hear as shown in tetrahedron 116 and steps 108 and 110 would occur to provide the converted speech of the text message on the speaker for the driver to hear. At this point, radio display 28 may also display the text message for the driver to view as well.

Figure 5:
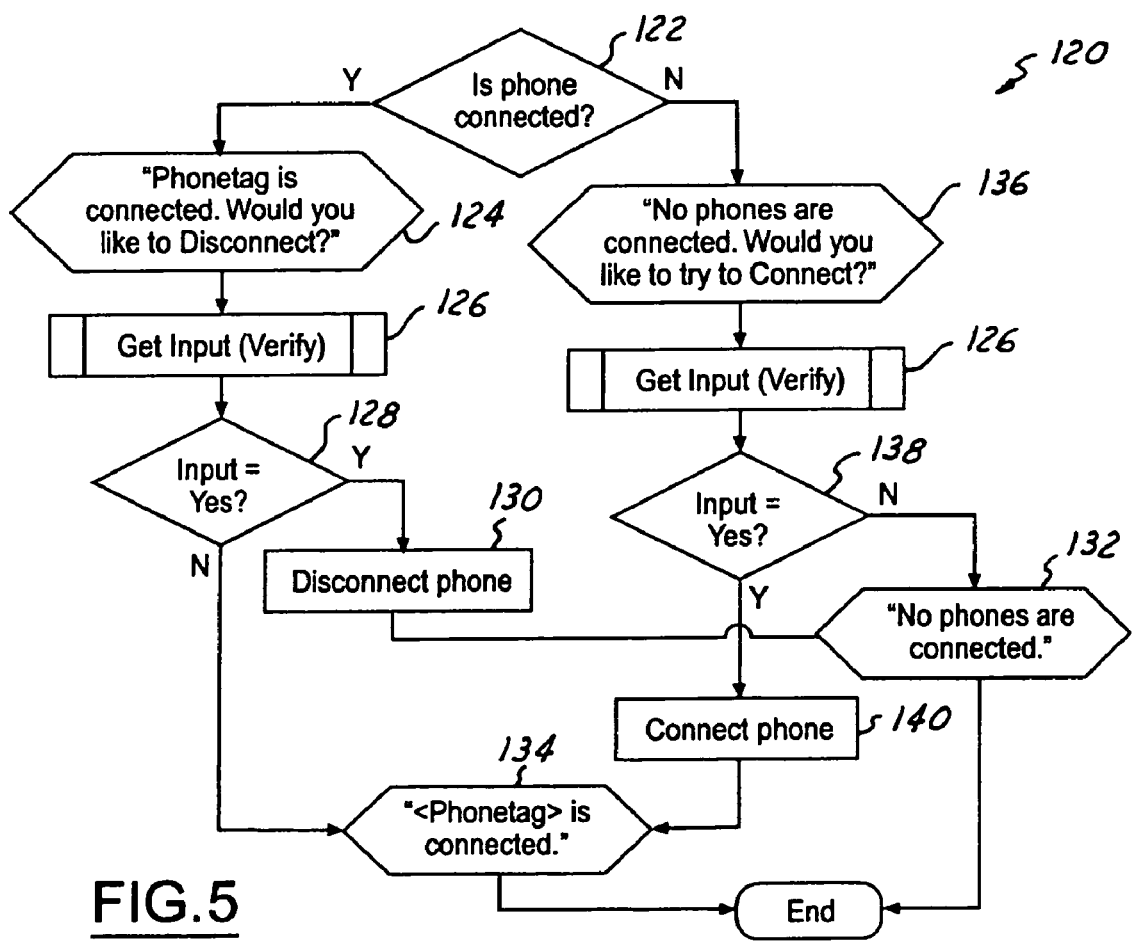
FIG. 5 illustrates a flowchart illustrating the operation in accordance with the present invention of using voice commands of an operator of the vehicle in order to manually connect and disconnect, from the telephone system, a Bluetooth™ enabled device such as a cell phone with the telephone system.

Referring now to FIG. 5, with continual reference to FIG. 1, a flowchart 120 illustrating the operation in accordance with the present invention of using voice commands of the driver in order to manually connect and disconnect, from telephone system 10, a Bluetooth™ enabled device such as cell phone 13 with the telephone system is shown. This feature enables the driver to manually connect and disconnect devices to and from communications module 16 using voice commands inputted to voice recognition module 18. That is, the manual connect and disconnect is initialized from telephone system 10 in response to the driver's request. In order to use a Bluetooth™ enabled device such as cell phone 13 with communications module 16, the cell phone and the communications module need to be associated with one another through a process called "connecting." If more than one device in the vicinity of communications module 16 is connected with the communications module, then the communications module communicates with the device having the highest pairing priority.

In order to connect and disconnect cell phone 13 with communications module 16 using voice commands, the driver presses button 22 to advise telephone system 10 to enter the voice activated connect and disconnect mode. In turn, communications module 16 communicates with cell phone 13 to see if the cell phone is connected with the communications module as shown in diamond 122. If cell phone 13 is connected with communications module 16 then memory 24 will have this connection information along with a name (i.e., <phone tag>) of the cell phone. Voice synthesizer 30 outputs an indication such as "<phone tag> is connected, would you like to disconnect" over speaker 32 for the driver to hear as shown in tetrahedron 124. Controller 14 then waits to receive a voice command from the driver as shown in block 126. If the voice command is "yes" as shown in diamond 128, then controller 14 disconnects cell phone 13 from communications module 16 as shown in block 130. Voice synthesizer 30 then outputs a confirmation to the effect of "<phone tag> is disconnected" over speaker 32 for the driver to hear as shown by tetrahedron 132. If the voice command from the driver at diamond 128 is "no", then voice synthesizer 30 outputs a confirmation to the effect of "<voice tag> is connected" over speaker 32 for the driver to hear as shown by tetrahedron 134.

If at diamond 122 cell phone 13 is not connected with communications module 16, then voice synthesizer 30 outputs an invitation such as "phone is not connected, do you want to connect phone" over speaker 32 for the driver to hear as shown by tetrahedron 136. Controller 14 then waits to receive a voice command from the driver as shown in block 126. If the voice command is "yes" at diamond 138, then controller 14 connects cell phone 13 to communications module 16 as shown in block 140. Voice synthesizer 30 outputs a confirmation such as "<voice tag> is connected" over speaker 32 for the driver to hear as shown by tetrahedron 134.

Figure 6:
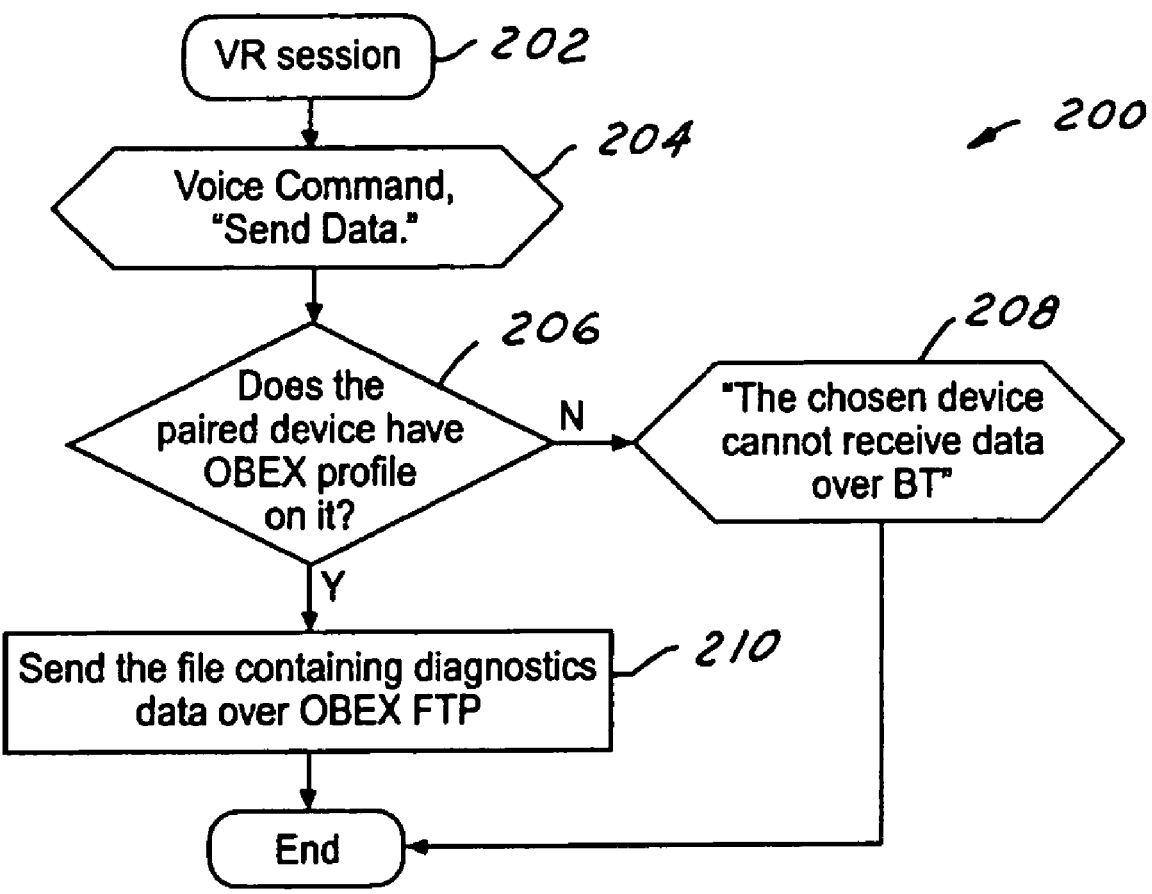
FIG. 6 illustrates a flowchart illustrating the operation in accordance with the present invention of transmitting vehicle diagnostics from the telephone system to a Bluetooth™ enabled device.

Referring now to FIG. 6, with continual reference to FIG. 1, a flowchart 200 illustrating the operation in accordance with the present invention of transmitting vehicle diagnostics from telephone system 10 to a Bluetooth™ enabled device is shown. The Bluetooth™ enabled device may be a laptop or any other device running a diagnostics application. The device may be located outside of the vehicle such as in a garage or vehicle maintenance center. Vehicle diagnostics such as engine conditions, brake and tire wear, VIN, mileage, oil change maintenance, etc. is stored in memory 24. Communications module 16 wirelessly transmits the stored vehicle diagnostics to the Bluetooth™ enabled device using OBEX.

The driver may initiate this transfer by pressing button 22 to initiate a voice recognition session for the vehicle diagnostic transfer from telephone system 10 to a paired Bluetooth™ enabled device as shown in oval 202. The driver then speaks the proper command such as "send data" into microphone 20 for receipt by voice recognition module 18 as shown in tetrahedron 204. Controller 14 then uses communication module 16 to poll the Bluetooth™ enabled device to see if the device is operable with the OBEX file transfer protocol (FTP) as shown in diamond 206. If the device is not, then voice synthesizer 30 outputs an indication such as "the chosen device cannot receive data" over speaker 32 for the driver to hear as shown in tetrahedron 208. If the device is operable with the OBEX FTP, then communication module 16 transfers the vehicle diagnostic information stored in memory 24 to the device over the OBEX FTP as shown in block 210.

Referring back to FIG. 1, the operation in accordance with the present invention of storing two or more phonebooks in memory 24 for the driver to use and access will now be described. In general, memory 24 may store two different phonebooks each having a list of entries. Each phonebook is associated with a respective name such as User1 and User2. As indicated above, each entry may have a voice tag of a name text and a list of associated telephone numbers. In operation, voice synthesizer 30 provides an output on speaker 32 for the driver to hear indicating which phonebook in memory 24 is enabled for the driver to use. For example, the User1 phonebook may be enabled initially. The driver could then switch to the other phonebook by stating the vocal command "User2" in microphone 20 for receipt by voice recognition module 18. In turn, controller 14 enables the User2 phonebook and disables the User1 phonebook.

In general, the success rate for locating a voice tag stored in a phonebook is a function of the amount of voice tags stored in the phonebook. As such, by employing two phonebooks having a lesser amount of voice tags than a single phonebook having the same total amount of voice tags, the recognition rate will be greater during operation of telephone system 10. The phonebooks stored in memory 24 may store other information which is personal to different operators such as seat location, radio presets, etc. In this case, controller 14 controls the appropriate vehicle components as a function of which phonebook is enabled.

Still referring to FIG. 1, the operation in accordance with the present invention of transmitting MP3 files from a Bluetooth™ enabled device to telephone system 10 for play over speaker 32 in accordance with voice commands of the driver will now be described. Instead of or in addition to cell phone 13, another Bluetooth™ enabled device such as a PDA or laptop computer may be paired and connected to communications module 16 to communicate therewith. Such a Bluetooth™ enabled device 13 may include MP3 music files. Device 13 communicates with communications module 16 to transfer the MPS music files to memory 24. In accordance with voice commands of the driver, controller 14 controls the operation of speaker 32 to play selected music files. Controller 14 also controls the operation of radio display 28 to display related music control information for the viewer to view. Likewise, controller 14 controls voice synthesizer 30 to output related music control information on speaker 32 for the driver to hear.

Thus, it is apparent that there has been provided, in accordance with the present invention, methods of operating a hands-free, Bluetooth™ enabled telephone system for a vehicle that fully satisfy the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A hands-free telephone system for a vehicle comprising:

a Bluetooth™ enabled cell phone located in the vehicle, the cell phone storing a phonebook having entries, each entry including a name text and an associated telephone number; and a vehicle appliance integrated into the vehicle, the vehicle appliance having a Bluetooth™ enabled communications module, memory, a text-to-speech (TTS) module, and a voice synthesizer;

the communications module being operable for wirelessly communicating with the cell phone to receive a selected phonebook entry from the cell phone;

the TTS module being operable for converting the name text of the selected phonebook entry into a voice tag for play by the voice synthesizer over a vehicle speaker for the operator to hear;

the memory being operable for storing the converted voice tag and the associated telephone number of the selected phonebook entry in a phonebook for access by the voice synthesizer;

wherein the vehicle appliance further includes a controller operable for accessing the memory to determine if the converted voice tag of the name text of the selected phonebook entry corresponds to a voice tag of a name text already stored in the memory, wherein if the converted voice tag of the name text of the selected phonebook entry corresponds to a voice tag of a name text already stored in the memory, the voice synthesizer outputs an indication over the vehicle speaker for the driver to hear indicating that the converted voice tag of the name text of the selected phonebook entry corresponds to a voice tag of a name text already stored in the memory;

wherein the vehicle appliance further includes a voice recognition module operable for receiving a verbal pronunciation of the converted voice tag of the selected phonebook entry by the operator, the voice recognition module being operable for converting the verbal pronunciation into a voice tag for play by the voice synthesizer over the vehicle speaker for the operator to hear;

wherein the memory is operable for storing the voice tag converted by the voice recognition module in place of the converted voice tag generated by the TTS module for access by the voice synthesizer.

2. The system of claim 1 wherein: the voice recognition module is operable for recognizing voice commands stated by the operator, wherein the controller generates a control signal to control operation of a vehicle component in response to a vehicle component voice command received by the voice recognition module from the operator.

3. The system of claim 1 wherein:
the communications module wirelessly communicates with the cell phone to receive the selected phonebook entry using the OBEX file transfer protocol.

4. The system of claim 1 wherein:
the memory has at least first and second memory phonebooks for storing entries, each memory phonebook storing a list of entries with each entry including a voice tag and an associated telephone number, wherein one of the memory phonebooks is operable at a time.

5. The system of claim 4 wherein:
the voice recognition module is operable for receiving a voice command indicative of a selected memory phonebook from the operator, the controller being operable for enabling the selected memory phonebook for use by the operator.

6. The system of claim 1 wherein:
the voice recognition module is operable for receiving a voice command indicative of disconnecting the cell phone from the communications module, the controller being operable for disconnecting the communications module from the cell phone in response to the voice command.

7. The system of claim 6 wherein:
the voice recognition module is operable for receiving a second voice command indicative of connecting the disconnected cell phone with the communications module, the controller being operable for reconnecting the cell phone with the communications module in response to the second voice command.

8. The system of claim 1 further comprising:
a Bluetooth™ enabled device;
wherein the controller is operable with vehicle components for generating vehicle diagnostic information;
wherein the memory is operable for storing the vehicle diagnostic information;
wherein the communications module is operable for wirelessly communicating the vehicle diagnostic information to the device.

9. The system of claim 8 wherein:
the communications module wirelessly communicates with the device to receive the diagnostic information using the OBEX file transfer protocol.

10. The system of claim 1 further comprising:
a second Bluetooth™ enabled device operable for storing MP3 music files;
wherein the communications module is operable for wirelessly communicating with the second device to receive the MP3 music files and the memory is operable for storing the received MP3 music files.

11. The system of claim 10 wherein:
the voice recognition module is operable for receiving voice commands of the operator, wherein the controller is operable with a vehicle radio system to play the MP3 music files over a vehicle speaker for the operator to hear in accordance with the voice commands of the operator.

\* \* \* \* \*